Nov. 30, 1954   J. F. HASENKAMP   2,695,976
AUTOMATIC IRRIGATION CONTROL MEANS
Filed Sept. 9, 1949

INVENTOR
JOHN F. HASENKAMP
BY
ATTORNEYS

United States Patent Office 2,695,976
Patented Nov. 30, 1954

2,695,976

AUTOMATIC IRRIGATION CONTROL MEANS

John F. Hasenkamp, North Hollywood, Calif.

Application September 9, 1949, Serial No. 114,743

5 Claims. (Cl. 315—76)

This invention has to do generally with electrical control apparatus and more particularly the automatic electrical control of irrigation systems.

An object of the invention is to provide a novel effective means of controlling the amount of water supplied to a given area of land by an irrigation system in response to the moisture requirements of the soil.

A further object of the invention is to provide an electrical means which is responsive to moisture or the absence of same and which may be used to operate or control various power circuits useful for an infinite variety of purposes.

Another object of the invention is to provide a new and improved simple means of determining the amount of moisture in the soil. In this connection it is an object to provide a novel moisture detector or moisture sensitive device and a novel method of using the same to give an accurate indication of the wetness of the soil.

More particularly, an object of the invention is to provide an electrical system or means for automatically controlling a plurality of irrigation pipes or the like in which the system as a whole may be energized periodically at desired intervals and which, when energized, will operate to supply water to only such of the pipes as furnish water to areas of land in need of it. In this connection, a further object is to provide such a system which is adjustable so that it may be set to operate to supply water only when the soil has less than a predetermined or given amount of moisture.

A still further object is to provide such a system wherein the moisture detector units may be so located in the soil and so connected as to achieve the desired depth of irrigation of the soil in a given area.

These and other objects will be apparent from the drawing and the following description.

Referring to the drawing, which is merely illustrative of certain forms my invention may take:

Figure 1:
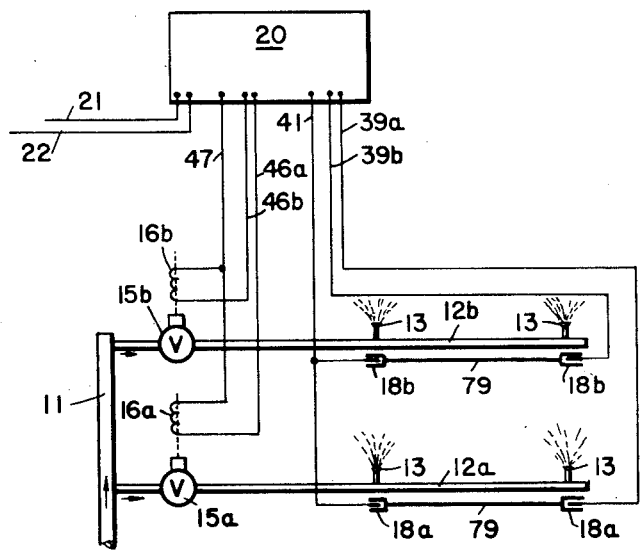
Fig. 1 is a diagrammatic view of an irrigation system and contol means therefor, embodying my invention.
Figure 2:
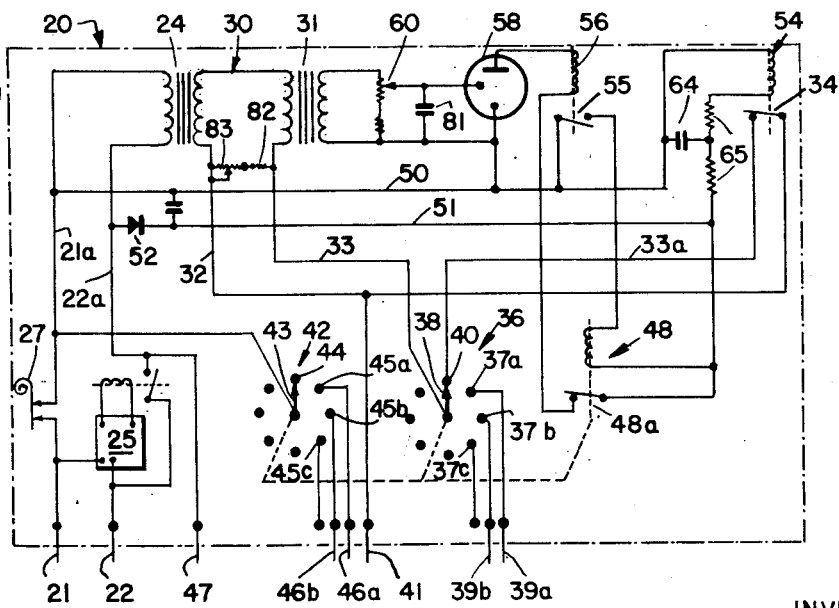
Fig. 2 is a schematic wiring diagram of the electrical control circuits.
Figures 3, 3A:
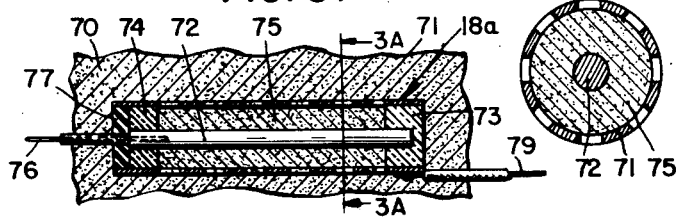
Fig. 3 is a longitudinal sectional view of a detector unit buried in the ground.
Fig. 3A is a section on line 3A—3A of Fig. 3.

More particularly describing the invention, in Figs. 1-3 I show a simple irrigation system embodying the invention. Referring to these figures, numeral 11 indicates a water supply pipe which it may be assumed is connected to a source of water under pressure. Two branch irrigation pipes 12a and 12b are shown leading from pipe 11, the branch pipes being provided with suitable outlets as sprinkler heads 13. In an actual installation, the pipes would usually be laid under the surface of the soil and the outlets or sprinkler heads disposed at desired elevations above the surface. Any number of branch pipes and outlets are provided, depending upon the area to be covered and the water pressure available.

Supply of water to the branch pipes is controlled by valves 15a and 15b which are normally closed. The valves are opened by solenoids 16a and 16b which will be described later.

In each section of ground covered by each branch irrigation pipe I provide moisture detector means and in Fig. 1 I show detector units 18a associated with branch pipe 12a and detector units 18b associated with branch pipe 12b. These units may be buried in the ground at a desired depth which will vary depending upon the nature of the soil and the vegetation being irrigated. The units in each section are connected electrically to a control unit, generally indicated by 20.

The control unit, when energized, is adapted to supply current successively to the detector units in each area of soil to be irrigated and successively to power circuits for operating the solenoids which actuate the valves. In a typical operation, current is first supplied to a detector circuit including detector units 18a and to a power circuit including solenoid 16a. If the soil in which units 18a are buried is not sufficiently moist, continued flow of current through solenoid 16a opens valve 15a thereby supplying water to branch pipe 12a. When the area has had enough water, or if it was originally sufficiently moist, the detector units pass sufficient current to cause the control unit to deenergize the detector and power circuits including, respectively, units 18a and solenoid 16a and to energize circuits including units 18b and solenoid 16b. The cycle is then repeated for the section covered by pipe 12b and as many additional sections as may be embodied in the system. The means whereby this is accomplished will now be described in detail.

Referring particularly to Fig. 2 for a description of the control unit 20, this unit is adapted to be connected to a suitable source of alternating current, such as a conventional 115-volt supply, by means of leads 21 and 22. Wires 21a and 22a form continuations of the leads and are connected to form what will be called the A. C. supply circuit through the primary coil of a transformer 24. A manual switch (not shown) may be provided in this circuit if desired. Preferably I provide a time or clock switch 25 in the circuit so that the system may be fully automatic and be set to operate at any desired time as at night, for instance, when the water pressure in city mains is usually relatively high. The time switch may be of a conventional type which closes the circuit at periodic intervals, as once every twenty-four hours, for a shorter period of time, say one or two hours, and then opens the circuit.

I may also provide a thermostatically controlled switch 27 in this circuit as a safety feature for the purpose of opening the circuit when the temperature is so low that there would be danger of the water freezing in the pipes.

The control unit includes what will be termed a moisture detector circuit, generally indicated by 30. This includes the secondary winding of transformer 24 and the primary winding of a transformer 31. I prefer to employ a somewhat lower voltage in this circuit than in the supply circuit and this may conveniently be 24 volts. In the original or normal position of the device this circuit is closed through conductors 32, 33, and 33a and a normally closed relay switch 34. However, as will later be explained, after initial energization of the controller, switch 34 opens and remains open until time switch 25 opens the A. C. supply circuit. Included in circuit 30 is a detector unit selector switch 36 having contacts 37a, 37b, 37c, etc., the first two of which are shown connected to the detector units 18a and 18b, respectively, by conductors 39a and 39b. The movable contact arm 38 of the switch is connected to conductor 33 and, when in its original position, rests on a contact button 40 which is connected to switch 34 by conductor 33a, thereby completing the detector circuit as aforementioned. A common lead 41 runs from conductor 32 to the detector units.

A power circuit selector switch is provided for successively supplying current to the solenoids for operating the valves. This switch, indicated by numeral 42, has a movable contact arm 43 which is connected to conductor 21a. This arm originally makes contact with a dead contact point 44. Other contact points 45a, 45b, 45c, etc., are provided, one for each valve-operating solenoid. The first two of these are shown connected to the solenoids 16a and 16b by conductors 46a and 46b. A common lead 47 runs from conductor 22a to the several solenoids.

The two selector switches are ganged together in any manner to be advanced one contact for each energization of a step relay 48 which is connected across conductors 50 and 51 supplying direct current to a relay 54. A rectifier is indicated at 52. Included in the circuit with the step relay is a normally open switch 55 forming part of a relay 56, the coil of which is in series in the plate circuit of a cold cathode tube 53. The grid of the tube is connected to transformer 31 through the medium of a potentiometer 60. The cathode is connected to the same transformer and to negative supply conductor 50.

A step relay breaker switch 48a is connected in series in the plate circuit of the tube and this switch opens upon energization of step relay 48 after a time delay sufficient for the relay to advance the selector switches. A conventional step or stepping relay may be used and connected electrically as shown and described herein.

After initial energization of the control unit, as by closing of time switch 25, switch 34 opens and thereafter the amount of current flowing through the moisture detection circuit 30 is governed by the impedance offered by detector unit or units in the circuit at any given time through which the current must flow to complete the circuit. In order to hold switch 34 closed long enough after initial energization of the control unit to accomplish the first actuation of the step relay 48, a condenser 64 is connected across the relay intermediate resistors 65. Thus, when the control unit circuits are initially energized the detector circuit is closed through switch 34 and starter voltage is furnished the tube whereby to cause current flow in the plate circuit of the tube. This latter closes switch 55 of relay 56 thereby energizing step relay 48 which actuates the selector switches for the first operation thereof. Relay 48 subsequently opens breaker switch 48a in the plate circuit with the result that switch 55 opens and relay 48 becomes deenergized.

In Figs. 3 and 3A I show a preferred form of moisture detector unit adapted to be buried in the soil 70. The unit comprises an outer electrode 71 in the form of an apertured metal casing. Within this is mounted an inner metal electrode 72. Porcelain or other insulation bushings 73 and 74 serve to mount the two electrodes in spaced relation leaving a space 75 therebetween which is filled with soil. The bushing 73 encloses the end of the inner electrode at one end. The other end projects through bushing 74, receiving an insulated conductor 76. A plug 77 of an insulative and sealing material covers this end of the inner electrode. An insulation covered conductor 79 is attached to the outer electrode. It will be apparent that the electrodes may be formed of various materials. However, I prefer to utilize non-corrodible metals for this purpose.

As previously indicated, I prefer to employ two moisture detector units for each area to be irrigated by a branch irrigation pipe. However, it is only necessary to employ one such unit and more than two may be used if desired, as where a large area is to be controlled. By using two units and placing them at different depths in the soil it is possible to accurately control depth of irrigation under a variety of conditions. It often happens that the upper surface layer of soil becomes dried out while there is still sufficient moisture at lower levels. At other times, as after a light rain, the surface soil may be quite wet and yet at a depth the ground may be too dry. With two such detector units connected in series and buried at different depths these conditions may be detected and irrigation supplied as required.

In connecting the detector units I prefer to connect the outer electrodes of the devices together, as by a length of insulated wire 79 (Fig. 1). The inner electrodes are connected one to the common line 41 and the other to one of the contact points of the detector selector switch 36. Thus the inner electrodes are at the voltage potential of the detector circuit and the outer electrodes, being connected together, are both at the same potential. The construction of the detectors and the manner of connecting them thus prevents the current taking an undesired path through or over the soil and makes possible an accurate determination of the moisture of the soil in the given areas. Furthermore, since alternating current is employed, electrolysis is eliminated.

The operation of the system is as follows: The time clock switch is set to operate at any desired hour, at which time the A. C. supply circuit is closed and remains closed for a given period of time, assuming that the thermostat switch 27 is closed. Current then flows through transformer 24 energizing the detector circuit. The current also branches for flow through rectifier 52 for plate circuit operation of the cold cathode tube and relay 56. The relay 54, which is closed prior to energization, opens after a slight delay as previously explained, the delay permitting starter anode current to flow with the result that current flows through the tube energizing relay 56 and closing the switch portion 55 thereof. With the closing of the switch, the circuit through the step relay 48 is closed and energization of this relay advances the two detector switches to the next switch contact point.

The step relay, after advancing the selector switches, opens the breaker switch 48a which is in series in the plate circuit of the tube. When the plate circuit is opened, relay 56 is deenergized and the step relay is deenergized.

On the first actuation of the step switches, the movable contact arm 38 of switch 36 makes contact with button 37a thereby bringing the moisture detector units 18a into series in the detector circuit 30. At the same time, contact arm 43 of step switch 42 makes contact with the button 45a establishing a circuit through solenoid 16a which opens valve 15a to branch irrigation pipe 12a. When the area covered by pipe 12a has received sufficient water, the soil, including that within the detectors, becomes moist enough to lower the impedance of the detector units sufficiently that the resultant flow of current in the detector circuit will induce a starting voltage for the tube, current will flow in the plate circuit of the tube closing relay 56 which in turn again energizes the step relay with the result that the selector switches are advanced. Of course, if the soil was originally wet, there would be an immediate flow of sufficient current in the detector circuit with the result that the step relay will immediately kick the selector switches over to the next contact.

It will be apparent that by adjusting the setting of potentiometer 60, the system may be set to be responsive to any desired degree of moisture in the soil. I may add a condenser 81 in the grid-cathode circuit to take care of variations or surges in the supply circuit and increase the accuracy. I may also employ a fixed resistor 82 and a variable resistor 83, connected in series across the detector circuit, to introduce a further adjustment in the system.

When the step switches have moved around to their original positions, the system ceases operating until it is disconnected from the source of current and again connected, as by the normal operation of the time control switch. The reason for this is that the detector circuit is open since switch 34 remains open after the initial delay in opening of the same at the start of the operation. Hence transformer 31 is dead and no starter anode current is supplied to the tube. It may also be noted that the movable arm of the power circuit selector switch now rests on the dead contact button so that no current is supplied to any of the valve-operation solenoids.

Figure 4:
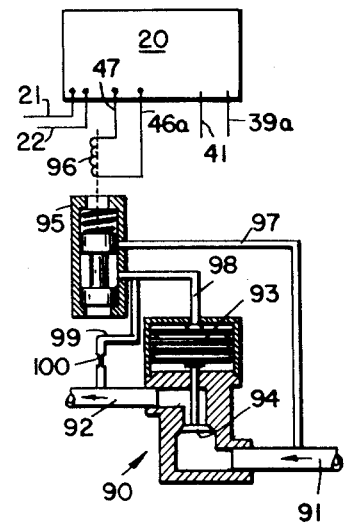
Fig. 4 is a diagrammatic view of one means of operating the valves in the water lines.

In Fig. 4 I show another means of operating the valves which connect the main water supply line with the branch lines. In this form of the invention I provide a valve 90, the inlet of which communicates with the water supply pipe 91. A branch irrigation pipe 92 leads from the outlet of the valve. A bellows 93 operates valve element 94 which is normally closed by the pressure of the water in the supply line.

I provide a pilot valve 95 which is actuated by solenoid 96 connected in a power circuit of the control unit 20. A pressure pipe 97 connects the water supply line and the pilot valve and a second pipe 98 leads from the pilot valve to the bellows of the main valve 90. It will be apparent that when the solenoid actuates the pilot valve, water under pressure is supplied to the bellows of the main valve opening the valve. When the pilot valve closes upon deenergization of the solenoid, the water under pressure in the bellows is bled to the branch pipe which is at atmospheric pressure by a pipe 99. This pipe is either of relatively smaller diameter than pipe 98 or has a restriction 100 therein, as shown, for the dual purpose of insuring sufficient pressure to actuate the main valve and of preventing sudden release of pressure on the bellows such as would permit rapid closing of the main valve with consequent water hammer.

It will be apparent that the above-described system of Fig. 4 has the advantage that the pilot valves may be installed wherever desired and small diameter copper tubing run to the main valves. This reduces the cost of installation eliminating excessive wiring and large piping.

Figure 5:
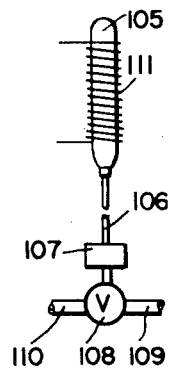
Fig. 5 is a diagrammatic view of another means of operating the valves in the water lines.

In Fig. 5 I show another form of the invention wherein a fluid having a high coefficient of expansion contained in bulb 105 and tube 106 is used for actuating a bellows or other valve actuator mechanism, indicated at 107 and associated with a valve 108 located between supply pipe 109 and branch irrigation pipe 110. The fluid is heated by electric coil 111 which is connected in a power circuit controlled by the control unit 20. Expansion of the fluid when heated by the coil opens the valve which is normally closed.

While I have shown and described the control means in connection with and adapted for the control of irrigation systems, it will be apparent that the electrical control means may be used for the control and operation of many other types of apparatus and equipment and that it may be used with other moisture detector units.

I claim:

1. In electrical control apparatus, means for testing the degree of moisture in a substance such as soil, comprising a detector circuit including moisture-responsive detector means connected in series in the circuit and adapted to be placed in the substance to be tested, the impedence of said detector means varying with the degree of moisture in said substance at said detector means, a source of alternating current for energizing said detector circuit, a cold cathode tube, a direct current supply for said tube, the cathode and grid of said tube being coupled to said detector circuit for furnishing a starter voltage for the tube, and means for opening the detector circuit, said means being operable in response to current flow in the plate circuit of the tube.

2. Testing means as set forth in claim 1 in which adjustable means are provided in the grid circuit of the tube for varying the characteristics of said circuit thereby to adjustably determine the starter voltage required to operate the tube.

3. In electrical control apparatus, means for testing the degree of moisture in a substance such as soil, comprising a detector circuit including moisture-responsive detector means connected in series in the circuit and adapted to be placed in the substance to be tested, the impedance of said detector means varying with the degree of moisture in said substance at said detector means, a source of alternating current for energizing said detector circuit, a cold cathode tube, a direct current supply for said tube, the cathode and grid of said tube being coupled to said detector circuit for furnishing a starter voltage for the tube, and a relay connected for energization upon flow of current in the plate circuit of said tube adapted to open said detector circuit when the relay is energized.

4. In electrical control apparatus, means for testing the degree of moisture in a substance such as soil, comprising a moisture-detecting circuit including moisture-responsive detector means connected in series in the circuit and adapted to be placed in the medium to be tested, the impedance of said detector means varying with the degree of moisture in said substance at said detector means, a source of alternating current for energizing said detector circuit, a cold cathode tube, a direct current supply for said tube, the cathode and grid of said tube being coupled to said detector circuit for furnishing a starter voltage for the tube, and a relay connected for energization upon flow of current in the plate circuit of said tube adapted to open said detector circuit when the relay is energized, said relay also being adapted to open the plate circuit of said tube after opening said detector circuit.

5. In electrical control apparatus, means for testing the degree of moisture in a substance such as soil, comprising a detector circuit including moisture-responsive detector means connected in series in the circuit and adapted to be placed in the substance to be tested, the impedance of said detector means varying with the degree of moisture in said substance at said detector means, a source of alternating current for energizing said detector circuit, adjustable means in said detector circuit for varying the characteristics thereof, a cold cathode tube, a direct current supply for said tube, the cathode and grid of said tube being coupled to said detector circuit for furnishing a starter voltage for the tube, and means for opening the detector circuit, said means being operable in response to current flow in the plate circuit of the tube.

References Cited in the file of this patent

UNITED STATES PATENTS

| Number | Name | Date |
| --- | --- | --- |
| 1,568,214 | Elder | Jan. 5, 1926 |
| 1,910,021 | Legg | May 23, 1933 |
| 1,978,440 | Shepard | Oct. 30, 1934 |
| 2,166,058 | Kirk | July 11, 1939 |
| 2,315,733 | Pfleger | Apr. 6, 1943 |
| 2,331,229 | Reagan | Oct. 5, 1943 |
| 2,364,264 | Yeomans | Dec. 5, 1944 |
| 2,497,505 | Martin | Feb. 14, 1950 |
| 2,509,027 | Zimmerman | May 23, 1950 |